US011244569B2

(12) United States Patent
Ke et al.

(10) Patent No.: US 11,244,569 B2
(45) Date of Patent: Feb. 8, 2022

(54) METHOD FOR SAFE POSITIONING AND RELATED PRODUCTS

(71) Applicant: GUANGDONG OPPO MOBILE TELECOMMUNICATIONS CORP., LTD., Guangdong (CN)

(72) Inventors: Shixing Ke, Guangdong (CN); Yadong Hu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/149,472

(22) Filed: Jan. 14, 2021

(65) Prior Publication Data

US 2021/0134157 A1 May 6, 2021

Related U.S. Application Data

(63) Continuation of application No. PCT/CN2019/094420, filed on Jul. 2, 2019.

(30) Foreign Application Priority Data

Aug. 1, 2018 (CN) .......................... 201810864159.6

(51) Int. Cl.
   *G08G 1/16* (2006.01)
   *H04W 4/40* (2018.01)
   *H04W 4/02* (2018.01)

(52) U.S. Cl.
   CPC ............ *G08G 1/166* (2013.01); *H04W 4/023* (2013.01); *H04W 4/40* (2018.02)

(58) Field of Classification Search
   CPC .................................................... G08G 1/166
   See application file for complete search history.

(56) References Cited

U.S. PATENT DOCUMENTS

| 10,315,563 | B1* | 6/2019 | Harper | .................. | G08G 1/166 |
| 10,414,336 | B1* | 9/2019 | Harper | .................. | B60Q 5/006 |

(Continued)

FOREIGN PATENT DOCUMENTS

| CN | 104685431 | 6/2015 |
| CN | 104807458 | 7/2015 |

(Continued)

OTHER PUBLICATIONS

EPO, Extended European Search Report for EP Application No. 19845454.8, dated Jul. 28, 2021.

(Continued)

*Primary Examiner* — Ernest G Tacsik
(74) *Attorney, Agent, or Firm* — Hodgson Russ LLP

(57) ABSTRACT

A method for safe positioning and related products are provided. Three neighbor awareness network (NAN) devices at a road junction are determined, and a NAN among an electronic device and the three NAN devices is established, where each of the three NAN devices in the NAN locates at a fixed position. Positions of the electronic device and positions of a vehicle in a same plane coordinate map are obtained, where the electronic device and the vehicle are positioned by the three NAN devices, and determine that the vehicle is approaching the electronic device according to positional variations of the electronic device and the vehicle. A distance between the electronic device and the vehicle is determined according to the positions of the electronic device and the positions of the vehicle, and reminding information is outputted when the distance is smaller than a preset threshold.

17 Claims, 8 Drawing Sheets

(56) References Cited

U.S. PATENT DOCUMENTS

| | | | | |
|---|---|---|---|---|
| 2005/0246100 | A1* | 11/2005 | Nath | G08G 1/164 |
| | | | | 701/301 |
| 2011/0084823 | A1* | 4/2011 | McCarthy | G08G 1/01 |
| | | | | 340/435 |
| 2012/0126996 | A1* | 5/2012 | McCarthy | G08G 1/166 |
| | | | | 340/902 |
| 2014/0145838 | A1* | 5/2014 | Tuukkanen | G08G 1/162 |
| | | | | 340/436 |
| 2018/0018888 | A1 | 1/2018 | Townsend | |
| 2018/0090005 | A1 | 3/2018 | Philosof et al. | |
| 2018/0186370 | A1* | 7/2018 | Denson | G08G 1/161 |
| 2018/0350241 | A1* | 12/2018 | Ikeda | G08G 1/09 |
| 2019/0031144 | A1* | 1/2019 | Gat | B60R 25/25 |
| 2019/0143967 | A1* | 5/2019 | Kutila | G05D 1/0257 |
| | | | | 701/23 |

FOREIGN PATENT DOCUMENTS

| | | |
|---|---|---|
| CN | 105578413 | 5/2016 |
| CN | 106068034 | 11/2016 |
| CN | 106297330 | 1/2017 |
| CN | 106842122 | 6/2017 |
| CN | 107005830 | 8/2017 |
| CN | 107274722 | 10/2017 |
| CN | 107370506 | 11/2017 |
| CN | 107710791 | 2/2018 |
| CN | 108053689 | 5/2018 |
| JP | 2016115211 | 6/2016 |
| WO | 2014186593 | 11/2014 |
| WO | 2016183804 | 11/2016 |
| WO | 2017211410 | 12/2017 |
| WO | 2018116827 | 6/2018 |

OTHER PUBLICATIONS

CNIPA, Decision of Refusal for CN Application No. 201810864159.6, dated Sep. 27, 2021.
WIPO, ISR and WO for PCT/CN2019/094420, Oct. 10, 2019.
SIPO, First Office Action for CN Application No. 201810864159.6, dated Aug. 4, 2020.
CNIPA, Second Office Action for CN Application No. 201810864159.6, dated Apr. 30, 2021.

* cited by examiner

METHOD FOR SAFE POSITIONING AND RELATED PRODUCTS

CROSS-REFERENCE TO RELATED APPLICATION(S)

This application is a continuation of International Application No. PCT/CN2019/094420, filed on Jul. 2, 2019, which claims priority to Chinese Patent Application No. 2018108641596, filed on Aug. 1, 2018, the entire disclosures of which are incorporated herein by reference.

TECHNICAL FIELD

This disclosure relates to the field of electronic technology, and particularly to a method for safe positioning and related products.

BACKGROUND

With the popularization of electronic devices (mobile terminals such as mobile phones, tablet PCs, etc.), the electronic devices can support more and more applications and become more powerful. The electronic device develops towards diversification and individuation, and becomes an essential electronic product in users' lives.

However, the popularization of the electronic devices also causes users to spend a lot of time using mobile phones and ignore unexpected situations in the reality. For example, when pedestrians cross a road, if the pedestrian bows his/her head to play the mobile phone without paying attention to vehicles, a great safety hazard may exist. Some right-turning vehicles easily conflict with pedestrians going straight even though there are traffic lights at a road junction to indicate traffic, and if the pedestrian does not pay attention to the right-turning vehicles, it is easy to cause safety problems. However, some junctions even have no traffic light, and turning vehicles often appear suddenly. Therefore, how to position the pedestrian and remind the pedestrian of nearby vehicles that may cause safety problems is a problem to be solved.

SUMMARY

Implementations of the disclosure provide a method for safe positioning and related products.

According to a first aspect, a method for safe positioning is provided. The method includes the following. Three neighbor awareness network (NAN) devices at a road junction are determined, and a NAN among an electronic device and the three NAN devices is established, where each of the three NAN devices in the NAN locates at a fixed position. Positions of the electronic device and positions of a vehicle in a same plane coordinate map are obtained, where the electronic device and the vehicle are positioned by the three NAN devices, and determine whether the vehicle is approaching the electronic device according to positional variations of the electronic device and the vehicle. A current distance between the electronic device and the vehicle is determined according to the positions of the electronic device and the positions of the vehicle based on a determination that the vehicle is approaching the electronic device, and reminding information is outputted when the distance is smaller than a preset threshold.

According to second aspect, an electronic device is provided. The electronic device includes at least one processor and a non-transitory computer readable storage. The a non-transitory computer readable storage is coupled to the at least one processor and storing at least one computer executable instruction thereon which, when executed by the at least one processor, causes the at least one processor to: determine three neighbor awareness network (NAN) devices at a road junction, and establish a NAN among an electronic device and the three NAN devices, where each of the three NAN devices in the NAN locates at a fixed position; obtain positions of the electronic device and positions of a vehicle in a same plane coordinate map, where the electronic device and the vehicle are positioned by the three NAN devices, and determine whether the vehicle is approaching the electronic device according to positional changes of the electronic device and the vehicle; determine a current distance between the electronic device and the vehicle according to the positions of the electronic device and the positions of the vehicle based on a determination that the vehicle is approaching the electronic device, and output reminding information in response to that the current distance is smaller than a preset threshold.

According to a third aspect, a non-transitory computer readable storage medium is provided. The non-transitory computer readable storage medium stores computer programs. The computer programs, when executed by a processor, causes the processor to: determine three neighbor awareness network (NAN) devices at a road junction, and establish a NAN among an electronic device and the three NAN devices, where each of the three NAN devices in the NAN locates at a fixed position; obtain positions of the electronic device and positions of a vehicle in a same plane coordinate map, where the electronic device and the vehicle are positioned by the three NAN devices, and determine whether the vehicle is approaching the electronic device according to positional changes of the electronic device and the vehicle; determine a current distance between the electronic device and the vehicle according to the positions of the electronic device and the positions of the vehicle based on a determination that the vehicle is approaching the electronic device, and output reminding information in response to that the current distance is smaller than a preset threshold.

BRIEF DESCRIPTION OF THE DRAWINGS

To describe the technical solutions of the implementations of the disclosure or the related art more clearly, the following will give a brief description of accompanying drawings used for describing the implementations of the disclosure or the related art. Apparently, the accompanying drawings described in the following are merely some implementations of the disclosure. Those of ordinary skill in the art can also obtain other accompanying drawings based on the accompanying drawings described below without creative efforts

DETAILED DESCRIPTION

In order to enable those skilled in the art to better understand solutions of the disclosure, technical solutions embodied in implementations of the disclosure will be described in a clear and comprehensive manner in conjunction with the accompanying drawings. It is evident that the implementations described herein are merely some rather than all of the implementations of the disclosure. All other implementations obtained by those of ordinary skill in the art based on the implementations of the disclosure without creative efforts shall fall within the protection scope of the disclosure.

The terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the disclosure. The phrase appearing in various places in the specification does not necessarily refer to the same implementations, nor does it refer to an independent or alternative implementation that is mutually exclusive with other implementations. It is expressly and implicitly understood by those skilled in the art that an implementation described herein may be combined with other implementations.

The electronic device involved in the implementations of the disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like. For convenience of description, the devices mentioned above are collectively referred to as electronic devices.

The following will describe the technical solutions of the disclosure in detail.

Figure 1A:
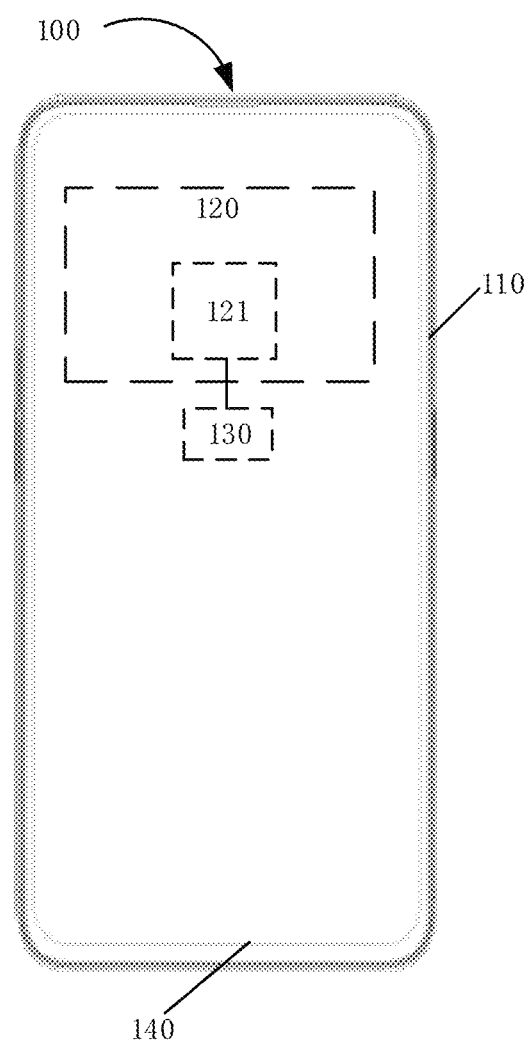
FIG. 1A is a schematic structural diagram illustrating an electronic device according to implementations of the disclosure.

FIG. 1A is a schematic structural diagram illustrating an electronic device 100 according to implementations of the disclosure. As illustrated in FIG. 1A, the electronic device 100 includes a housing 110, a circuit board 120 arranged in the housing 110, a positioning device 130, and a display screen 140 arranged on the housing 110. The circuit board 120 is provided with a processor 121. The positioning device 130 is coupled to the processor 121, and the processor 121 is coupled to the display screen 140.

The following will describe the technical solutions of the disclosure in detail.

Figure 1B:
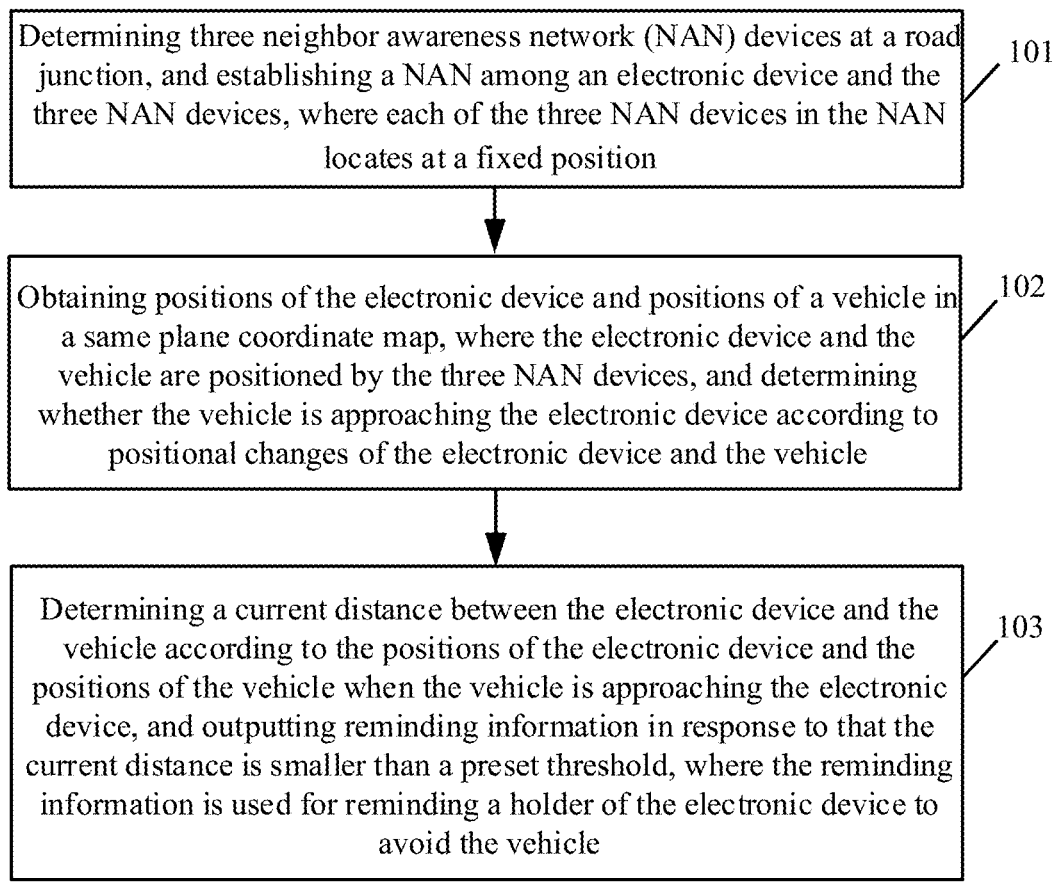
FIG. 1B is a schematic flow chart illustrating a method for safe positioning according to implementations of the disclosure.

FIG. 1B is a schematic flow chart illustrating a method for safe positioning according to implementations of the disclosure. The method provided herein is applicable to the electronic device illustrated in FIG. 1A. As illustrated in FIG. 1B, the method begins at 101.

At 101, three neighbor awareness network (NAN) devices at a road junction are determined, and a NAN among an electronic device and the three NAN devices is established, where each of the three NAN devices in the NAN locates at a fixed position.

In the wireless fidelity (Wi-Fi) technology based NAN, multiple devices with NAN functions (NAN devices for short) and an electronic device can establish a NAN, such that data transmission can be conducted among the multiple NAN devices as well as each NAN device and the electronic device in the NAN. Generally, the NAN devices are fixedly installed at the road junction, and the electronic device is carried by a user. According to implementations, multiple NAN devices each locating at a fixed position are installed at the road junction, and thus the position of each NAN device can be determined. When the user holds an electronic device and enters a sensing range of the multiple NAN devices, the electronic device can establish a NAN with any three NAN devices among the multiple NAN devices. In one example, the electronic device can create a NAN group and set a group identifier of the NAN group. The electronic device can send a beacon to each NAN device nearby. After receiving the beacon sent by the electronic device, each NAN device can send to the electronic device a request to join in the NAN group, such that the electronic device can establish the NAN group according to the received request. In the NAN group, the electronic device can conduct information interaction, data transmission, or the like with the three NAN devices.

At 102, positions of the electronic device and positions of a vehicle in a same plane coordinate map are obtained, where the electronic device and the vehicle are positioned by the three NAN devices, and determine whether the vehicle is approaching the electronic device according to positional changes of the electronic device and the vehicle.

According to implementations, the electronic device and the vehicle share the same plane coordinate map. The electronic device can send a ranging request to each NAN device, and then determine, according to feedback information received from each NAN device, the fixed position of each NAN device and a relative distance between each NAN device and the electronic device. Since the position of the user changes during walking, the relative distance between each NAN device and the electronic device can be obtained at a preset time interval.

In at least one implementation, in the operation at 102, the positions of the electronic device and the positions of the vehicle in the same plane coordinate map are obtained as follows. At a preset time interval: a first positioning request for the electronic device is sent to each NAN device, where the first positioning request is used for instructing to obtain the fixed position of each NAN device and a relative distance between each NAN device and the electronic device, and a second positioning request for the vehicle is sent to each NAN device, where the second positioning request is used for instructing to obtain a relative distance between each NAN device and the vehicle. According to the fixed position of each NAN device, the relative distance between each NAN device and the electronic device, and the relative distance between each NAN device and the vehicle, a position of the electronic device and a position of the vehicle in the same plane coordinate map in each preset time interval is determined.

In one example, the three NAN devices are a first NAN device, a second NAN device, and a third NAN device. The electronic device can respectively send a first positioning request to the first NAN device, the second NAN device, and the third NAN device. After receiving the first positioning request, each NAN device can send signals including its fixed position to the electronic device, such that the electronic device can obtain a first fixed position, a second fixed position, and a third fixed position. Thereafter, the electronic device can respectively obtain the relative distance between the electronic device and each NAN device according to a signal strength of signals received by the electronic device from each of the three NAN devices, thereby obtaining a first relative distance between the electronic device and the first NAN device, a second relative distance between the electronic device and the second NAN device, and a third relative distance between the electronic device and the third NAN device.

In one example, since there is a correlation between signal strengths and distances, multiple signal strengths at multiple distances can be obtained in advance, and a corresponding relationship between the multiple signal strengths and the multiple distances can be established. Thus, the relative distance between each NAN device and the electronic device can be obtained as follows. The electronic device obtains a signal strength of signals received by the electronic device from each NAN device, where the signals are sent by the NAN device in response to the first positioning request. A relative distance corresponding to signal strength of signals received by the electronic device from each NAN device is determined according to the corresponding relationship between the multiple signal strengths and the multiple distances, to obtain three relative distances.

Figure 1C:
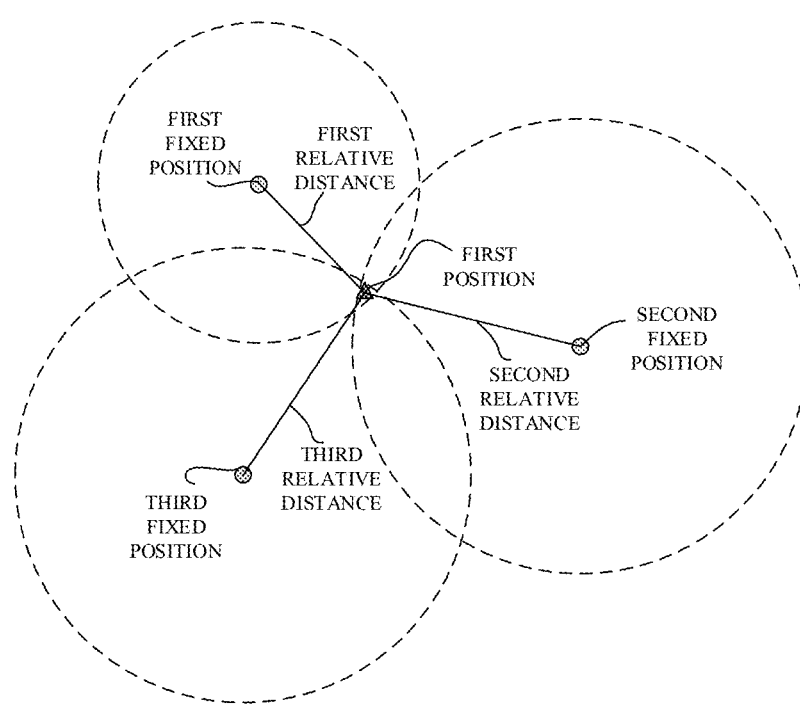
FIG. 1C is a schematic diagram illustrating determination of a first position of an electronic device according to three fixed positions and three relative distances according to implementations of the disclosure.

FIG. 1C is schematic diagram illustrating determination of a first position of the electronic device according to the three fixed positions and the three relative distances according to implementations of the disclosure. As illustrated in FIG. 1C, the first position of the electronic device is determined as follows. A circle can be determined with the first fixed position as a center of the circle and the first relative distance as a radius of the circle. Another circle can be determined with the second fixed position as a center of the other circle and the second relative distance as a radius of the other circle. Yet another circle can be determined with the third fixed position as a center of the yet another circle and the third relative distance as a radius of the yet another circle. As such, the first position of the electronic device can be determined according to an overlap among the three circles.

After the position of the electronic device is determined, it is necessary to determine the position of the vehicle. There is a target device in the vehicle so that the NAN devices can position the vehicle by positioning the target device. The target device may be an electronic device supporting NAN functions or other NAN devices, such that the target device can also conduct information interaction, data transmission, or the like with the three NAN devices. Since the position of the electronic device held by the pedestrian and the position of the vehicle are not fixed, when the distance between the electronic device and the vehicle is far, it is difficult for the electronic device to position the vehicle. Therefore, it is necessary to use the NAN device having the fixed position at the road junction to position the vehicle, and then send a positioning result to the electronic device.

Figure 1D:
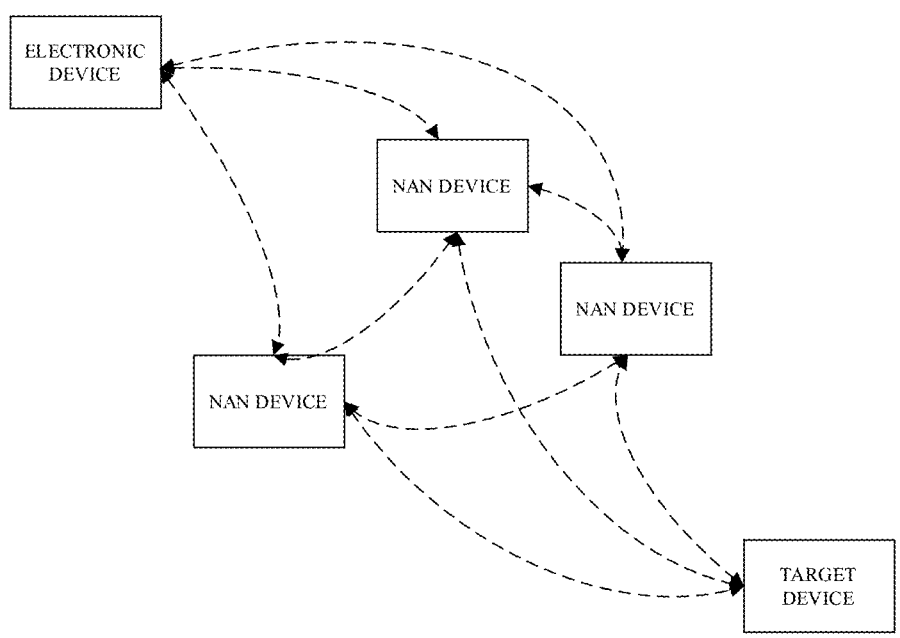
FIG. 1D is a schematic diagram illustrating determination of a target position of a vehicle according to NAN devices according to implementations of the disclosure.

FIG. 1D is a schematic diagram illustrating determination of a target position of the vehicle according to the NAN devices according to implementations of the disclosure. As illustrated in FIG. 1D, the electronic device can respectively send a second positioning request to each NAN device. After receiving the second positioning request, each NAN device can obtain a separation distance (fed back by the target device in the vehicle) between each NAN device and the target device in the vehicle, so as to obtain a first separation distance between the target device and the first NAN device, a second separation distance between the target device and the second NAN device, and a third separation distance between the target device and the third NAN device. In the implementation, since the target device in the vehicle can conduct information interaction with the three NAN devices, the manner in which the target device in the vehicle obtains three separation distances between the three NANs device and the target device in the vehicle is the same as that in which the electronic device obtains the relative distances between the NAN devices and the electronic device. That is, the target device in the vehicle can also obtain the three separation distances between the three NANs device and the target device in the vehicle and then send the three separation distances to the NAN devices. A circle can be determined with the first fixed position as a center of the circle and the first separation distance as a radius of the circle. Another circle can be determined with the second fixed position as a center of the other circle and the second separation distance as a radius of the other circle. Yet another circle can be determined with the third fixed position as a center of the yet another circle and the third separation distance as a radius of the yet another circle. As such, the target position of the target device (i.e., the position of the vehicle) can be determined according to an overlap among the three circles.

According to the fixed position of each NAN device, the relative distance between each NAN device and the electronic device, and the relative distance between each NAN device and the vehicle, the position of the electronic device and the position of the vehicle can be determined, such that a relative distance between the electronic device and the vehicle in the same plan coordinate map can be determined. In addition, since the relative distance between the electronic device and the vehicle needs to be obtained in real time, the position of the electronic device and the position of the vehicle need to be continuously obtained at a preset time interval. The preset time interval may be a small value, such as 1 second (s), 2 s, 30 milliseconds (ms), or the like. However, if within a first preset time interval (such as 2 s), no relative distance between the vehicle and the NAN device fed back to the electronic device by the NAN device is received, it indicates that the vehicle is far from the NAN device, such that the time interval for obtaining the position of the electronic device and the position of the vehicle can be set to be a second preset time interval longer than the first preset time interval. That is, the first preset time interval and the second preset time interval may be equal or may not be equal.

In at least one implementation, after sending the first positioning request for the electronic device and the second positioning request for the vehicle at the preset time interval, determine whether the vehicle is approaching the electronic device according to the positional changes of the electronic device and the vehicle as follows. A first position of the electronic device and a first position of the vehicle in the same plan coordinate map are obtained and a first relative distance between the electronic device and the vehicle is determined according to the first position of the electronic device and the first position of the vehicle, and a second position of the electronic device and a second position of the vehicle in the same plan coordinate map are obtained and a second relative distance between the electronic device and the vehicle is determined according to the second position of the electronic device and the second position of the vehicle. Determine that the vehicle is approaching the electronic device when the second relative distance is smaller than the first relative distance.

Figure 1E:
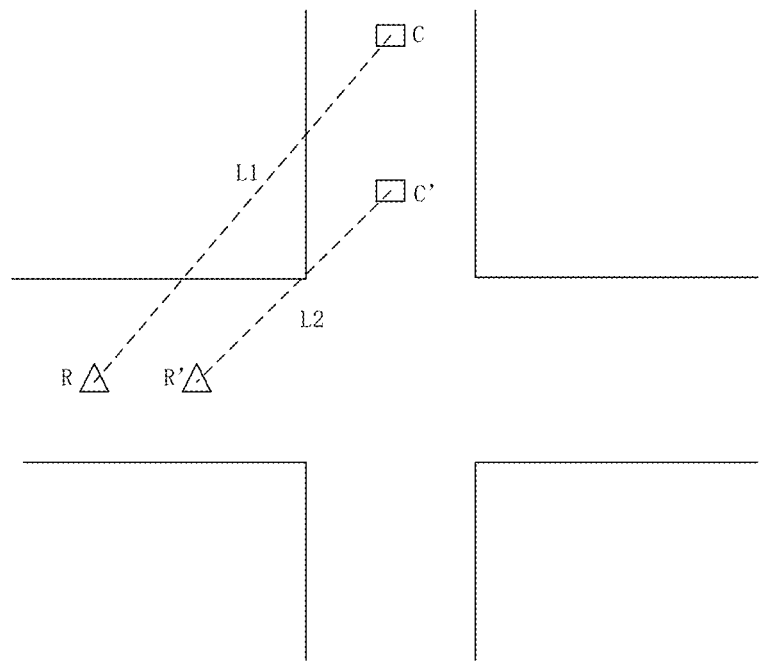
FIG. 1E is a schematic diagram illustrating determining that an electronic device is approaching a vehicle according to implementations of the disclosure.

FIG. 1E is a schematic diagram illustrating determining that the electronic device is approaching the vehicle according to implementations of the disclosure. As illustrated in FIG. 1E, in the same plane coordinate map, the first position of the electronic device and the first position of the vehicle obtained are respectively expressed as R and C, and the first relative distance L1 between the electronic device and the vehicle can be determined according to R and C. In addition, the second position of the electronic device and the second position of the vehicle obtained are respectively expressed as R' and C', and the second relative distance L2 between the electronic device and the vehicle can be determined according to R' and C'. Obviously, L1>L2, which indicates that the distance between the electronic device and the vehicle is reduced, that is, it can be determined that the vehicle is approaching the electronic device.

In at least one implementation, sending positioning requests for obtaining positions of the electronic device and the vehicle may be performed at different time intervals. For example, after sending the first positioning request for obtaining the position of the electronic device and sending the second positioning request for obtaining the position of the vehicle for the first time, if the obtained first relative distance between the electronic device and the vehicle is smaller than a preset distance threshold (such as 200 meters), the preset time interval for obtaining the second relative distance between the electronic device and the vehicle may be relatively long, that is, every relatively short time interval, the first positioning request for obtaining the position of the electronic device and the second positioning request for obtaining the position of the vehicle are sent once more. For another example, if the obtained first relative distance between the electronic device and the vehicle is larger than or equal to the preset distance threshold, the preset time interval for obtaining the second relative distance between the electronic device and the vehicle may be relatively short, that is, every relatively long time interval, the first positioning request for obtaining the position of the electronic device and the second positioning request for obtaining the position of the vehicle are sent once more. The relative distance between the vehicle and the electronic device may be a linear distance or a vertical distance, both of which can indicate a distance relationship between the vehicle and the electronic device.

In at least one implementation, after sending the first positioning request for the electronic device and the second positioning request for the vehicle at the preset time interval, determine whether the vehicle is approaching the electronic device according to the positional changes of the electronic device and the vehicle as follows. A first position of the electronic device and a first position of the vehicle in the same plan coordinate map are obtained, and a second position of the electronic device and a second position of the vehicle in the same plan coordinate map are obtained. A movement direction of the electronic device is determined according to the first position and the second position of the electronic device, and a movement direction of the vehicle is determined according to the first position and the second position of the vehicle. Determine that the vehicle is approaching the electronic device when the movement direction of the electronic device and the movement direction of the vehicle both have a movement component indicative of that the electronic device and the vehicle approach to each other.

Figure 1F:
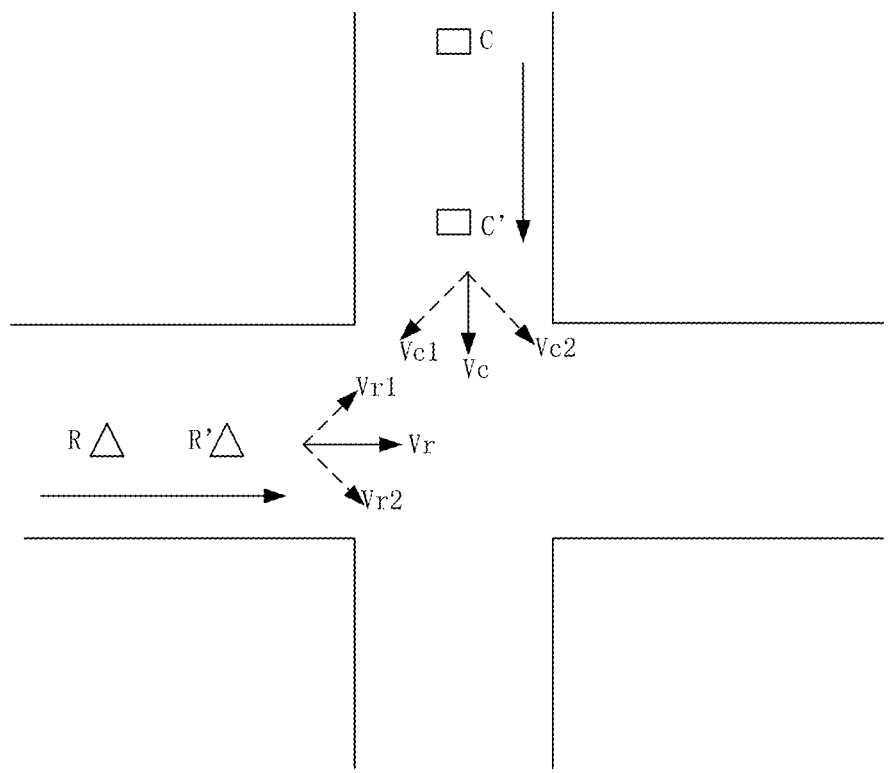
FIG. 1F is a schematic diagram illustrating determining that an electronic device is approaching a vehicle according to other implementations of the disclosure.

FIG. 1F is a schematic diagram of determining that the vehicle is approaching the electronic device according to other implementations of the disclosure. As illustrated in FIG. 1F, in the same plane coordinate map, the first position of the electronic device and the first position of the vehicle obtained are respectively expressed as R and C, and the second position of the electronic device and the second position of the vehicle obtained are respectively expressed as R' and C', and the movement direction Vr of the electronic device can be determined according to R and R', and the movement direction Vc of the vehicle can be determined according to C and C'. In one example, Vr can be decomposed into two movement components: Vr1 and Vr2, and Vc can be decomposed into two movement components: Vc1 and Vc2. Since Vr1 and Vc1 are two movement components indicative of that the electronic device and the vehicle approach to each other, it can be determined that the vehicle is approaching the electronic device.

In one example, it is possible to combine the method of determining that there is a decreased distance between the vehicle and the electronic device with the method of determining that the vehicle and the electronic device both have the movement component indicative of that the electronic device and the vehicle approach to each other, to determine that the vehicle is approaching the electronic device. That is, if the distance between the vehicle and the electronic device is reduced and the vehicle and the electronic device both have the movement component indicative of that the electronic device and the vehicle approach to each other, it can be determined that the vehicle is approaching the electronic device.

As can be seen, according to implementations, the position of the electronic device and the position of the vehicle can be obtained through the NAN formed by the NAN devices and the electronic device, so that the pedestrian and the vehicle can be accurately and conveniently positioned. In addition, since the vehicle is approaching the electronic device which is determined by determining that the relative distance between the electronic device and the vehicle is reduced, or the vehicle and the electronic device both have the movement component indicative of that the electronic device and the vehicle approach to each other, the speed of determining can be improved, and the conclusion of determining that the vehicle is approaching the electronic device can be quickly obtained.

At 103, a current distance between the electronic device and the vehicle is determined according to the positions of the electronic device and the positions of the vehicle when the vehicle is approaching the electronic device, and reminding information is outputted in response to that the current distance is smaller than a preset threshold, where the reminding information is used for reminding a holder of the electronic device to avoid the vehicle.

Under the premise of determining that the vehicle is approaching the electronic device, the current distance between the electronic device and the vehicle is determined as follows. A first position of the electronic device and a second position of the vehicle in the same plane coordinate map are obtained. A vertical distance between the electronic device and the vehicle is determined according to the first position of the electronic device and the second position of the vehicle, and the vertical distance is determined as the current distance between the electronic device and the vehicle. Alternatively, a first position of the electronic device and a second position of the vehicle in the same plane coordinate map are obtained. A linear distance between the electronic device and the vehicle is determined according to the first position of the electronic device and the second position of the vehicle, and the linear distance is determined as the current distance between the electronic device and the vehicle.

In one example, if the vehicle and the holder of the electronic device travel in opposite directions on a same road or on two parallel roads, the linear distance between the vehicle and the electronic device is determined as the distance between the electronic device and the vehicle. Otherwise, the linear distance or the vertical distance between the electronic device and the vehicle can be determined as the current distance between the electronic device and the vehicle.

According to implementations of the disclosure, since the vertical distance or the linear distance between the vehicle and the electronic device is determined as the current distance between the electronic device and the vehicle, the calculation efficiency can be improved, and thus the current distance between the electronic device and the vehicle can be quickly determined. In addition, in this way, the current distance can be determined and the reminding information can be outputted in time, which indirectly improves the security and effectiveness of the method for safe positioning.

In one example, a speed at which the vehicle and the electronic device move close to each other can be determined according to the preset time interval and the changes of the positions of the vehicle and the positions of the electronic device, where the vehicle and the electronic device are positioned by the NAN devices. According to the speed at which the vehicle and the electronic device move close to each other and a possible meeting position of the vehicle and the electronic device, determine whether a time period from a current time point to a time point at which the vehicle meets the electronic device is smaller than a preset time threshold. If yes, reminding information is outputted.

In one example, the reminding information is outputted when the current distance is smaller than the preset threshold as follows. At least one of voice reminding information or vibration reminding information is outputted when the current distance is smaller than the preset threshold, where the reminding information includes the current distance between the electronic device and the vehicle. An avoidance suggestion is provided for the holder of the electronic device, where the avoidance suggestion includes lane changing, speed changing, or pausing.

In one example, when the electronic device determines that the vehicle is approaching the electronic device and the distance between the electronic device and the vehicle is smaller than the preset threshold, the electronic device conducts voice reminding or vibration reminding or simultaneously conducts two kinds of reminding, and provides the current distance between the electronic device and the vehicle. In addition, the electronic device displays an avoidance suggestion on a display screen of the electronic device, for example, an avoidance suggestion may be displayed for recommending the user to stop walking until the vehicle passes, or lane changing is recommended if there are many vehicles in a direction the user is walking, or the like.

In one example, the electronic device can conduct physical fitness test (including test of a normal walking speed, a running speed, reaction ability, hearing, or the like) for the holder of the electronic device first, and thus provide the user with a customized reminding suggestion according to results of the test. For example, volume of voice and vibration level for reminding can be set according to the result of the testing of the hearing of the holder. For another example, the preset threshold of the distance can be set according to the reaction ability of the holder. For instance, the better the reaction ability of the holder, the smaller the preset threshold of the distance; otherwise, the larger the preset threshold of the distance. For yet another example, different avoidance suggestions are provided for holders having different walking speeds or running speeds. For instance, for a user having a fast walking speed or running speed, when the distance between the electronic device and the vehicle is larger than a dangerous distance, it can be recommended that the holder of the electronic device to increase the walking speed to pass a possible meeting position of the electronic device and the vehicle. Furthermore, the avoidance suggestion provided for the holder of the electronic device can also be provided according to a current state of the holder. For example, if it is detected that the holder of the electronic device is walking slowly, and a pause interval of the walking is larger than a preset pause interval, an avoidance suggestion is provided for the holder of the electronic device to suggest the holder to stop walking to avoid the vehicle. On the contrary, if it is detected that the holder of the electronic device is walking fast and a pause interval of the walking is smaller than the preset pause interval, and the distance between the holder and the vehicle is larger than the dangerous distance, an avoidance suggestion is provided for the holder of the electronic device to suggest the holder to increase the walking speed to pass the vehicle.

In one example, when the electronic device determines that the vehicle is approaching the electronic device, and the distance between the electronic device and the vehicle is smaller than the preset threshold, the electronic device can send warning information to the vehicle, such that the target device in the vehicle can receive the warning information, and improve a driving strategy (including giving way, pausing, or speeding off) according to the warning information.

According to implementations, different avoidance suggestions can be provided for different holders of electronic devices, which can not only remind users of the safety of the road junction, but also reserve sufficient reaction time for the users, thereby fully avoiding safety accidents. Further, normal traveling process of the user is not affected while the safety of the user is ensured, improving the practicability of the method for safe positioning.

In one example, the following can be conducted prior to determining the three NAN devices at the road junction.

Detect whether traffic lights exist at the road junction. Determine that no traffic light exists within a preset range of the road junction.

Before the vehicle and the electronic device positioned, first detect whether the traffic lights exist at the road junction. The reason is that for a road junction where there are traffic lights, the pedestrian can avoid the vehicle according to the traffic lights, but for road junctions where no traffic light exists, a high security hazard exists, and therefore it is necessary to position the vehicle and the electronic device through the NAN.

It can be understood that in the implementations, the electronic device determines the three NAN devices at the road junction, and establishes the NAN among the electronic device and the three NAN devices, where each of the three NAN devices in the NAN locates at the fixed position. The positions of the electronic device and the positions of the vehicle in the same plane coordinate map are obtained at the preset time interval, where the electronic device and the vehicle are positioned by the three NAN devices, and determine that the vehicle is approaching the electronic device according to the positional variations of the electronic device and the vehicle. Thereafter, the current distance between the electronic device and the vehicle is determined according to the positions of the electronic device and the positions of the vehicle, and the reminding information is outputted when the distance is smaller than the preset threshold, where the reminding information is used for reminding the holder of the electronic device to avoid the vehicle. As can be seen, the electronic device and the vehicle can be positioned through the NAN, and the current distance between the electronic device and the vehicle can be obtained. When the current distance between the electronic device and the vehicle is smaller than the preset threshold, the reminding information can be outputted to remind the holder of the electronic device, which improves the accuracy of positioning. In addition, the holder of the electronic device can be aware of nearby vehicles in time that may cause danger, which improves the safety of pedestrians passing the road junction.

Figure 2:
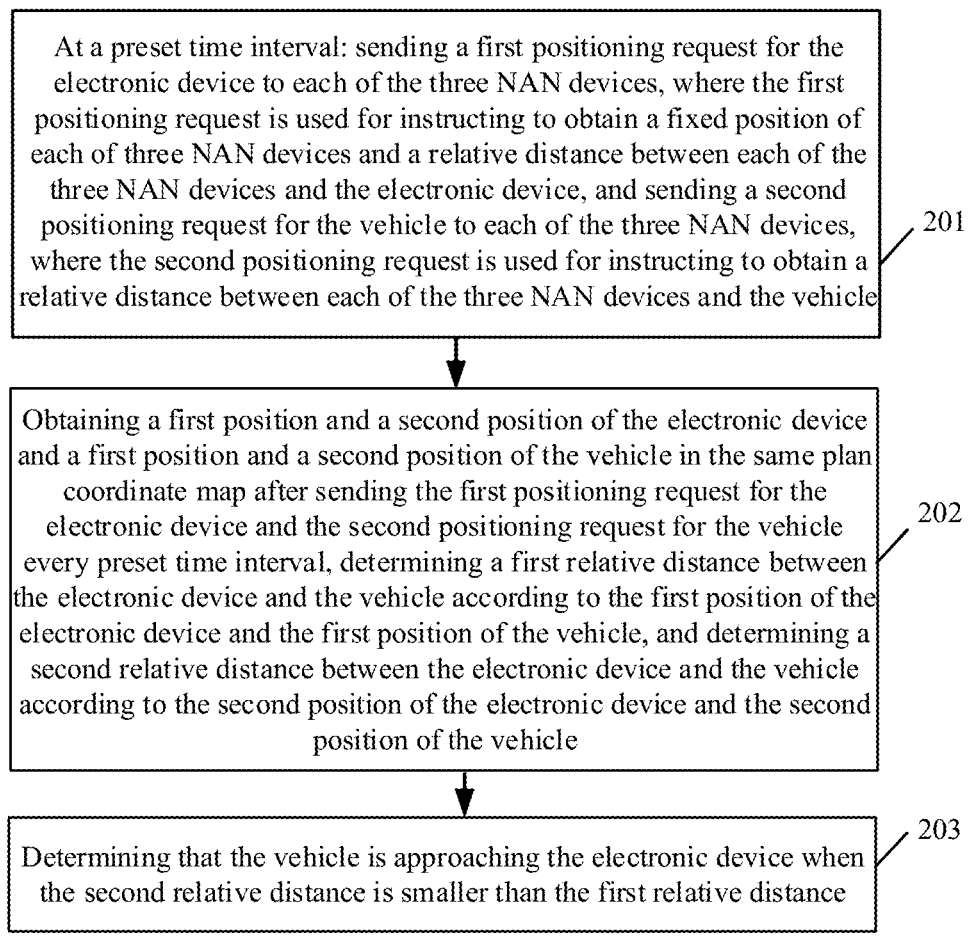
FIG. 2 is a schematic flow chart illustrating a method for determining whether a vehicle is approaching an electronic device according to implementations of the disclosure.

FIG. 2 is a schematic flow chart illustrating a method for determining whether a vehicle is approaching an electronic device according to implementations of the disclosure. The method illustrated in FIG. 2 is applicable to the electronic device in FIG. 1A. As illustrated in FIG. 2, the method begins at 201.

At 201, at a preset time interval, a first positioning request for the electronic device is sent to each of the three NAN devices, where the first positioning request is used for instructing to obtain a fixed position of each of three NAN devices and a relative distance between each of the three NAN devices and the electronic device, and a second positioning request for the vehicle is sent to each of the three NAN devices, where the second positioning request is used for instructing to obtain a relative distance between each of the three NAN devices and the vehicle.

At 202, a first position and a second position of the electronic device and a first position and a second position of the vehicle in the same plan coordinate map are obtained after sending the first positioning request for the electronic device and the second positioning request for the vehicle every preset time interval, a first relative distance between the electronic device and the vehicle is determined according to the first position of the electronic device and the first position of the vehicle, and a second relative distance between the electronic device and the vehicle is determined according to the second position of the electronic device and the second position of the vehicle.

In one example, every preset time interval the first positioning request for the electronic device and the second positioning request for the vehicle are sent to obtain multiple positions of the electronic device and multiple positions of the vehicle. For example, at a first time point, the first positioning request and the second positioning request are sent to obtain a first position of the electronic device and a first position of the vehicle, and at a second time point, the first positioning request and the second positioning request are sent once more to obtain a second position of the electronic device and a second position of the vehicle, where an interval between the first time point and the second time point equals the preset time interval. In other words, each time the first positioning request and the second positioning request are sent, a position of the electronic device and a position of the vehicle can be obtained.

At 203, determine that the vehicle is approaching the electronic device when the second relative distance is smaller than the first relative distance.

As can be seen, in the method for determining that the vehicle is approaching the electronic device described in the implementation of the disclosure, the relative distance between the vehicle and the electronic device can be determined, and then determine that the vehicle is approaching the electronic device according to the reduction of the relative distances determined in the previous time interval and the subsequent time interval. The method provided herein is easy to calculate, which helps to quickly obtain the result, thereby improving the real-time and effectiveness of the reminding information subsequently outputted by the electronic device.

Figure 3:
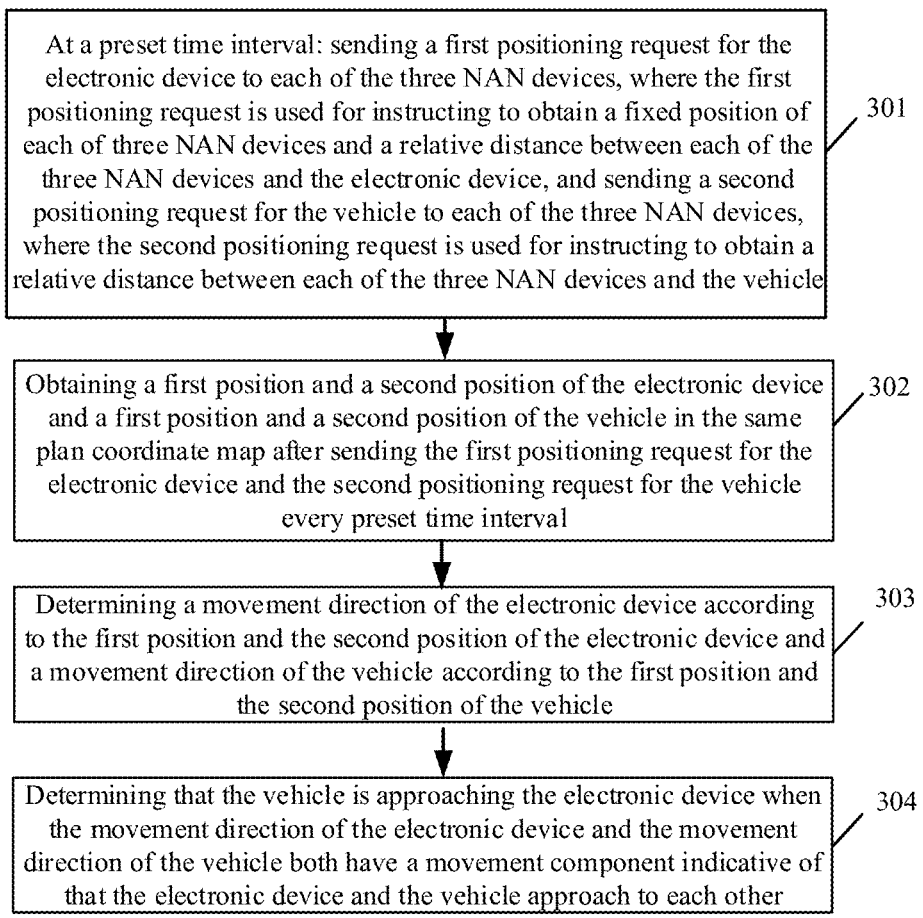
FIG. 3 is a schematic flow chart illustrating a method for determining whether a vehicle is approaching an electronic device according to other implementations of the disclosure.

Similar to the method illustrated in FIG. 2, FIG. 3 is a schematic flow chart illustrating a method for determining whether a vehicle is approaching an electronic device according to other implementations of the disclosure. The method illustrated in FIG. 3 is applicable to the electronic device in FIG. 1A. As illustrated in FIG. 3, the method begins at 301.

At 301, at a preset time interval, a first positioning request for the electronic device is sent to each of the three NAN devices, where the first positioning request is used for instructing to obtain a fixed position of each of three NAN devices and a relative distance between each of the three NAN devices and the electronic device, and a second positioning request for the vehicle is sent to each of the three NAN devices, where the second positioning request is used for instructing to obtain a relative distance between each of the three NAN devices and the vehicle.

At 302, a first position and a second position of the electronic device and a first position and a second position of the vehicle in the same plan coordinate map are obtained after sending the first positioning request for the electronic device and the second positioning request for the vehicle every preset time interval.

At 303, a movement direction of the electronic device is determined according to the first position and the second position of the electronic device and a movement direction of the vehicle is determined according to the first position and the second position of the vehicle.

At 304, determine that the vehicle is approaching the electronic device when the movement direction of the electronic device and the movement direction of the vehicle both have a movement component indicative of that the electronic device and the vehicle approach to each other.

As can be seen, in the method for determining that the vehicle is approaching the electronic device described in the implementations of the disclosure, the variations of the positions of the electronic device and the of the positions of the vehicle can be determined to determine the movement direction of the electronic device and the movement direction of the vehicle. Thereafter, determine that the vehicle is approaching the electronic device when the movement direction of the electronic device and the movement direction of the vehicle both have the movement component indicative of that the electronic device and the vehicle approach to each other. The method provided herein is easy to calculate, which helps to quickly obtain the result, thereby improving the real-time and effectiveness of the reminding information subsequently outputted by the electronic device.

Figure 4:
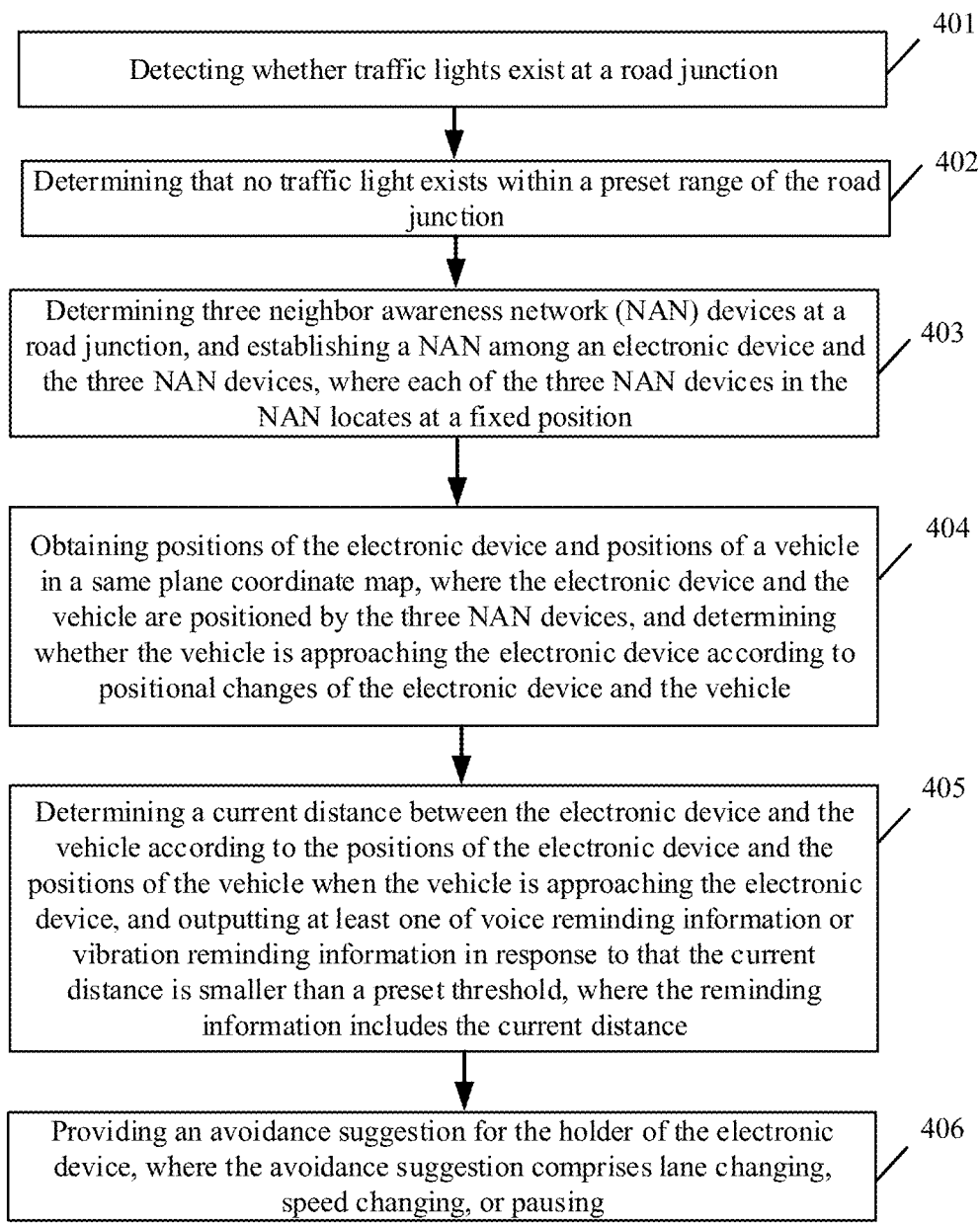
FIG. 4 is a schematic flow chart illustrating a method for safe positioning according to other implementations of the disclosure.

FIG. 4 is a schematic flow chart illustrating a method for safe positioning according to other implementations of the disclosure. The method illustrated in FIG. 4 is applicable to the electronic device in FIG. 1A. As illustrated in FIG. 4, the method begins at 401.

At 401, detect whether traffic lights exist at a road junction.

At 402, determine that no traffic light exists within a preset range of the road junction.

At 403, three NAN devices at the road junction are determined, and a NAN among an electronic device and the three NAN devices is established, where each of the three NAN devices in the NAN locates at a fixed position.

At 404, positions of the electronic device and positions of a vehicle in a same plane coordinate map are obtained, where the electronic device and the vehicle are positioned by the three NAN devices, and determine whether the vehicle is approaching the electronic device according to positional variations of the electronic device and the vehicle.

At 405, a current distance between the electronic device and the vehicle is determined according to the positions of the electronic device and the positions of the vehicle when the vehicle is approaching the electronic device, and at least one of voice reminding information or vibration reminding information is outputted when the current distance is smaller than a preset threshold, where the reminding information includes the current distance.

At 406, an avoidance suggestion is provided for the holder of the electronic device, where the avoidance suggestion includes lane changing, speed changing, or pausing.

As can be seen, in the method provided herein, the vehicle and electronic device can also be safely positioned under condition that there is no traffic light at the road junction. The electronic device and the vehicle are positioned through the NAN, and the relative distance between the electronic device and the vehicle is determined. When the relative distance between the electronic device and the vehicle is smaller than the preset threshold, the electronic device can output the reminding information to remind the holder of the electronic device, which improves the accuracy of positioning. In addition, the holder of the electronic device can be aware of nearby vehicles in time that may cause danger, which improves the safety of pedestrians passing the road junction.

The following describes a device for implementing the method for safe positioning described above.

Figure 5:
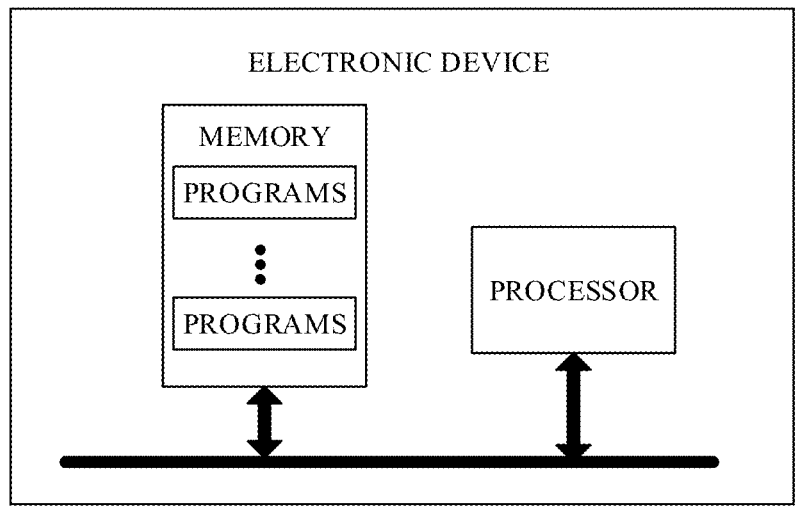
FIG. 5 is a schematic structural diagram illustrating an electronic device according to other implementations of the disclosure.

Similar to the foregoing implementations, FIG. 5 is schematic structural diagram illustrating an electronic device according to other implementations of the disclosure. As illustrated in FIG. 5, the electronic device includes a processor, a memory, and one or more programs. The one or more programs are stored in the memory and configured to be performed by the processor. The one or more programs include instructions for performing the following operations. Three NAN devices at a road junction are determined, and a NAN among an electronic device and the three NAN devices is established, where each of the three NAN devices in the NAN locates at a fixed position. Positions of the electronic device and positions of a vehicle in a same plane coordinate map are obtained, where the electronic device and the vehicle are positioned by the three NAN devices, and determine that the vehicle is approaching the electronic device according to positional variations of the electronic device and the vehicle. A current distance between the electronic device and the vehicle is determined according to the positions of the electronic device and the positions of the vehicle when the vehicle is approaching the electronic device, and reminding information is outputted when the distance is smaller than a preset threshold, where the reminding information is used for reminding a holder of the electronic device to avoid the vehicle.

In one example, in terms of obtaining the positions of the electronic device and the positions of the vehicle in the same plane coordinate map, instructions of the one or more programs are configured to: at a preset time interval: send a first positioning request for the electronic device to each of the three NAN devices, where the first positioning request is used for instructing to obtain the fixed position of each of the three NAN devices and a relative distance between each of the three NAN devices and the electronic device, and send a second positioning request for the vehicle to each of the three NAN devices, where the second positioning request is used for instructing to obtain a relative distance between each of the three NAN devices and the vehicle; determine a position of the electronic device and a position of the vehicle in the same plane coordinate map in each preset time interval, according to the fixed position of each of the three NAN devices, the relative distance between each of the three NAN devices and the electronic device, and the relative distance between each of the three NAN devices and the vehicle.

In one example, in terms of obtaining the relative distance between each of the three NAN devices and the electronic device, instructions of the one or more programs are configured to: obtain a signal strength of signals received by the electronic device from each of the three NAN devices; determine, according to a preset corresponding relationship between multiple signal strengths and multiple distances and the signal strength of the signals received by the electronic device from each of the three NAN device, a relative distance between each of the three NAN devices and the electronic device.

In one example, in terms of determining whether the vehicle is approaching the electronic device according to the positional changes of the electronic device and the vehicle, instructions of the one or more programs are configured to: at a preset time interval: send a first positioning request for the electronic device to each of the three NAN devices, where the first positioning request is used for instructing to obtain the fixed position of each of the three NAN devices and a relative distance between each of the three NAN devices and the electronic device, and send a second positioning request for the vehicle to each of the three NAN devices, where the second positioning request is used for instructing to obtain a relative distance between each of the three NAN devices and the vehicle; after sending the first positioning request for the electronic device and the second positioning request for the vehicle at the preset time interval: obtain a first position of the electronic device and a first position of the vehicle in the same plan coordinate map and determine a first relative distance between the electronic device and the vehicle according to the first position of the electronic device and the first position of the vehicle, and obtain a second position of the electronic device and a second position of the vehicle in the same plan coordinate map and determine a second relative distance between the electronic device and the vehicle according to the second position of the electronic device and the second position of the vehicle; determine that the vehicle is approaching the electronic device when the second relative distance is smaller than the first relative distance.

In one example, in terms of determining whether the vehicle is approaching the electronic device according to the positional changes of the electronic device and the vehicle, instructions of the one or more programs are configured to: at a preset time interval: send a first positioning request for the electronic device to each of the three NAN devices, where the first positioning request is used for instructing to obtain the fixed position of each of the three NAN devices and a relative distance between each of the three NAN devices and the electronic device, and send a second positioning request for the vehicle to each of the three NAN devices, where the second positioning request is used for instructing to obtain a relative distance between each of the three NAN devices and the vehicle; after sending the first positioning request for the electronic device and the second positioning request for the vehicle at the preset time interval: obtain a first position of the electronic device and a first position of the vehicle in the same plan coordinate map and obtain a second position of the electronic device and a second position of the vehicle in the same plan coordinate map; determine a movement direction of the electronic device according to the first position and the second position of the electronic device and a movement direction of the vehicle according to the first position and the second position of the vehicle; determine that the vehicle is approaching the electronic device when the movement direction of the electronic device and the movement direction of the vehicle both have a movement component indicative of that the electronic device and the vehicle approach to each other.

In one example, in terms of determining the current distance between the electronic device and the vehicle according to the positions of the electronic device and the positions of the vehicle, instructions of the one or more programs are configured to: obtain a first position of the electronic device and a second position of the vehicle in the same plane coordinate map, determine, according to the first position of the electronic device and the second position of the vehicle, a vertical distance between the electronic device and the vehicle, and determine the vertical distance as the current distance between the electronic device and the vehicle; or obtain a first position of the electronic device and a second position of the vehicle in the same plane coordinate map, determine, according to the first position of the electronic device and the second position of the vehicle, a linear distance between the electronic device and the vehicle, and determine the linear distance as the current distance between the electronic device and the vehicle.

In one example, in terms of outputting the reminding information when the current distance is smaller than the preset threshold, instructions of the one or more programs are configured to: output at least one of voice reminding information or vibration reminding information when the current distance is smaller than the preset threshold, where the reminding information includes the current distance; provide an avoidance suggestion for the holder of the electronic device, where the avoidance suggestion includes lane changing, speed changing, or pausing.

In one example, instructions of the one or more programs are further configured to: detect whether traffic lights exist at the road junction; determine that no traffic light exists within a preset range of the road junction.

Figure 6:
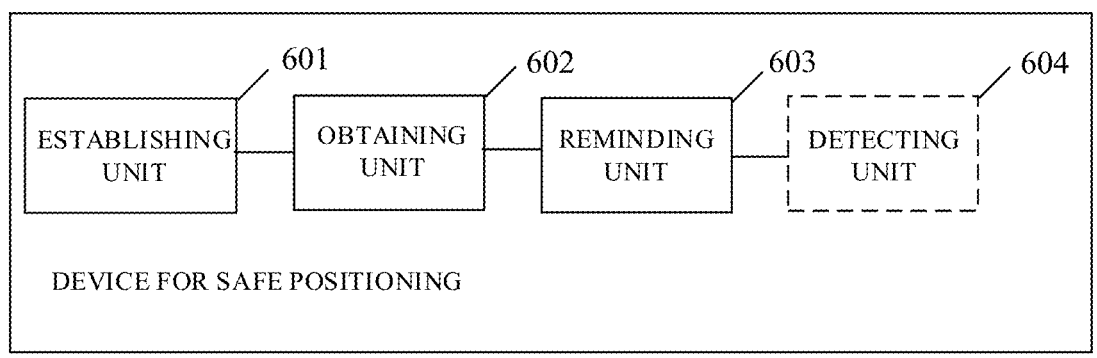
FIG. 6 is a schematic structural diagram illustrating a device for safe positioning according to implementations of the disclosure.

FIG. 6 is a schematic structural diagram illustrating a device for safe positioning according to implementations of the disclosure. As illustrated in FIG. 6, the device is applicable to an electronic device. The electronic device includes a display screen. The device includes an establishing unit 601, an obtaining unit 602, and a reminding unit 603.

The establishing unit 601 is configured to determine three NAN devices at a road junction, and establish a NAN among an electronic device and the three NAN devices, where each of the three NAN devices in the NAN locates at a fixed position. The obtaining unit 602 is configured to obtain positions of the electronic device and positions of a vehicle in a same plane coordinate map, where the electronic device and the vehicle are positioned by the three NAN devices, and determine that the vehicle is approaching the electronic device according to positional changes of the electronic device and the vehicle. The reminding unit 603 is configured to determine a current distance between the electronic device and the vehicle according to the positions of the electronic device and the positions of the vehicle when the vehicle is approaching the electronic device, and output reminding information when the current distance is smaller than a preset threshold, where the reminding information is used for reminding a holder of the electronic device to avoid the vehicle.

In at least one implementation, in terms of obtaining the positions of the electronic device and the positions of the vehicle in the same plane coordinate map, the obtaining unit 602 is configured to: at a preset time interval: send a first positioning request for the electronic device to each of the three NAN devices, where the first positioning request is used for instructing to obtain the fixed position of each of the three NAN devices and a relative distance between each of the three NAN devices and the electronic device, and send a second positioning request for the vehicle to each of the three NAN devices, where the second positioning request is used for instructing to obtain a relative distance between each of the three NAN devices and the vehicle; determine a position of the electronic device and a position of the vehicle in the same plane coordinate map in each preset time interval, according to the fixed position of each of the three NAN devices, the relative distance between each of the three NAN devices and the electronic device, and the relative distance between each of the three NAN devices and the vehicle.

In at least one implementation, in terms of obtaining the relative distance between each of the three NAN devices and the electronic device, the obtaining unit 602 is configured to: obtain a signal strength of signals received by the electronic device from each of the three NAN devices; determine, according to a preset corresponding relationship between multiple signal strengths and multiple distances and the signal strength of the signals received by the electronic device from each of the three NAN devices, a relative distance between each of the three NAN devices and the electronic device.

In at least one implementation, in terms of determining whether the vehicle is approaching the electronic device according to the positional changes of the electronic device and the vehicle, the obtaining unit 602 is configured to: at a preset time interval: send a first positioning request for the electronic device to each of the three NAN devices, where the first positioning request is used for instructing to obtain the fixed position of each of the three NAN devices and a relative distance between each of the three NAN devices and the electronic device, and send a second positioning request for the vehicle to each of the three NAN devices, where the second positioning request is used for instructing to obtain a relative distance between each of the three NAN devices and the vehicle; after sending the first positioning request for the electronic device and the second positioning request for the vehicle at the preset time interval: obtain a first position of the electronic device and a first position of the vehicle in the same plan coordinate map and determine a first relative distance between the electronic device and the vehicle according to the first position of the electronic device and the first position of the vehicle, and obtain a second position of the electronic device and a second position of the vehicle in the same plan coordinate map and determine a second relative distance between the electronic device and the vehicle according to the second position of the electronic device and the second position of the vehicle; determine that the vehicle is approaching the electronic device when the second relative distance is smaller than the first relative distance.

In at least one implementation, in terms of determining whether the vehicle is approaching the electronic device according to the positional changes of the electronic device and the vehicle, the obtaining unit 602 is configured to: at a preset time interval: send a first positioning request for the electronic device to each of the three NAN devices, where the first positioning request is used for instructing to obtain the fixed position of each of the three NAN devices and a relative distance between each of the three NAN devices and the electronic device, and send a second positioning request for the vehicle to each of the three NAN devices, where the second positioning request is used for instructing to obtain a relative distance between each of the three NAN devices and the vehicle; after sending the first positioning request for the electronic device and the second positioning request for the vehicle at the preset time interval: obtain a first position of the electronic device and a first position of the vehicle in the same plan coordinate map, and obtain a second position of the electronic device and a second position of the vehicle in the same plan coordinate map; determine a movement direction of the electronic device according to the first position and the second position of the electronic device and a movement direction of the vehicle according to the first position and the second position of the vehicle; determine that the vehicle is approaching the electronic device when the movement direction of the electronic device and the movement direction of the vehicle both have a movement component indicative of that the electronic device and the vehicle approach to each other.

In at least one implementation, in terms of determining the current distance between the electronic device and the vehicle according to the positions of the electronic device and the positions of the vehicle, the reminding unit 603 is configured to: obtain a first position of the electronic device and a second position of the vehicle in the same plane coordinate map, determine, according to the first position of the electronic device and the second position of the vehicle, a vertical distance between the electronic device and the vehicle, and determine the vertical distance as the current distance between the electronic device and the vehicle; or obtain a first position of the electronic device and a second position of the vehicle in the same plane coordinate map, determine, according to the first position of the electronic device and the second position of the vehicle, a linear distance between the electronic device and the vehicle, and determine the linear distance as the current distance between the electronic device and the vehicle.

In at least one implementation, in terms of outputting the reminding information when the current distance is smaller than the preset threshold, the reminding unit 603 is configured to: output at least one of voice reminding information or vibration reminding information when the current distance is smaller than the preset threshold, where the reminding information includes the current distance; provide an avoidance suggestion for the holder of the electronic device, where the avoidance suggestion includes lane changing, speed changing, or pausing.

In at least one implementation, the device further includes a detecting unit 604. The detecting unit 604 is configured to detect whether traffic lights exist at the road junction and determine that there is no traffic light within a preset range of the road junction.

It can be understood that in the device for safe positioning, the three NAN devices at the road junction are determined, and the NAN among the electronic device and the three NAN devices is established, where each of the three NAN devices in the NAN locates at the fixed position. The positions of the electronic device and the positions of the vehicle in the same plane coordinate map are obtained at the preset time interval, where the electronic device and the vehicle are positioned by the three NAN devices, and determine that the vehicle is approaching the electronic device according to the positional variations of the electronic device and the vehicle. Thereafter, the distance between the electronic device and the vehicle is determined according to the positions of the electronic device and the positions of the vehicle, and the reminding information is outputted when the distance is smaller than the preset threshold, where the reminding information is used for reminding the holder of the electronic device to avoid the vehicle. As can be seen, the electronic device and the vehicle can be positioned through the NAN, and the relative distance between the electronic device and the vehicle is obtained. When the relative distance between the electronic device and the vehicle is smaller than the preset threshold, the reminding information can be outputted to remind the holder of the electronic device, which improves the accuracy of positioning. As such, the holder of the electronic device can be aware of nearby vehicles that may cause danger in time, which improves the safety of pedestrians when they pass the road junction.

It can be understood that the functions of the program modules of the device for safe positioning in the implementation may be specifically implemented according to the method in the foregoing method implementations. For a specific implementation process thereof, reference may be made to the related description of the foregoing method implementations, and details are not described herein again.

Implementations of the disclosure also provide a computer storage medium. The computer storage medium stores computer programs which, when executed, are operable with a computer to perform all or part of the operations of any of the methods for safe positioning described in the above-described method implementations.

Implementations of the disclosure also provide a computer program product. The computer program product includes a non-transitory computer readable storage medium storing computer programs. The computer programs are operable with a computer to perform all or part of the operations of any of the methods for safe positioning described in the above method implementations.

It is to be noted that, for the sake of simplicity, the foregoing method implementations are described as a series of action combinations, however, it will be appreciated by those skilled in the art that the disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or not performed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a ROM, a RAM, a removable hard disk, a disk, a CD, or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the present disclosure in detail. The principle and implementations of the present disclosure are illustrated by specific examples. The illustration of the above implementations is merely used to facilitate understanding of the methods and core concept of the present disclosure. For a person skilled in the art, according to the concept of the present disclosure, specific implementations and application ranges may be both changed. Based on the above, the present disclosure shall not be understood to be limited to the specification.

What is claimed is:

1. A method for safe positioning, comprising:
   determining three neighbor awareness network (NAN) devices at a road junction, and establishing a Wi-Fi technology based NAN for communications among an electronic device and the three NAN devices;
   obtaining positions of the electronic device and positions of a vehicle in a same plane coordinate map;
   wherein obtaining the positions of the electronic device and the positions of the vehicle in the same plane coordinate map comprises:
   at preset time intervals:
      sending a first positioning request for the electronic device to each of the three NAN devices, wherein the first positioning request is used for instructing each of the three NAN devices to obtain the fixed position of each of the three NAN devices and a distance between each of the three NAN devices and the electronic device; and
      sending a second positioning request for the vehicle to each of the three NAN devices, wherein the second positioning request is used for instructing each of the three NAN devices to obtain a distance between each of the three NAN devices and the vehicle; and
      determining a position of the electronic device and a position of the vehicle in the same plane coordinate map in each preset time interval, according to the fixed position of each of the three NAN devices as received from each of the three NAN devices, the distance between each of the three NAN devices and the electronic device as received from each of the three NAN devices, and the distance between each of the three NAN devices and the vehicle as received from each of the three NAN devices;
   determining whether the vehicle is approaching the electronic device according to positional changes of the electronic device and the vehicle; and
   determining a current distance between the electronic device and the vehicle according to the positions of the electronic device and the positions of the vehicle based on a determination that the vehicle is approaching the electronic device, and outputting reminding information in response to that the current distance is smaller than a preset threshold.

2. The method of claim 1, wherein obtaining the distance between each of the three NAN devices and the electronic device comprises:
   obtaining a signal strength of signals received by the electronic device from each of the three NAN devices; and
   determining, according to a preset corresponding relationship between a plurality of signal strengths and a plurality of distances and the signal strength of the signals received by the electronic device from each of the three NAN devices, the distance between each of the three NAN devices and the electronic device.

3. The method of claim 1, wherein determining whether the vehicle is approaching the electronic device according to the positional changes of the electronic device and the vehicle comprises:
   obtaining a first position of the electronic device and a first position of the vehicle in the same plan coordinate map, and determining a first distance between the electronic device and the vehicle according to the first position of the electronic device and the first position of the vehicle;
   obtaining a second position of the electronic device and a second position of the vehicle in the same plan coordinate map, and determining a second distance between the electronic device and the vehicle according to the second position of the electronic device and the second position of the vehicle; and
   determining that the vehicle is approaching the electronic device when the second relative distance is smaller than the first distance.

4. The method of claim 1, wherein determining whether the vehicle is approaching the electronic device according to the positional changes of the electronic device and the vehicle comprises:
   obtaining a first position of the electronic device and a first position of the vehicle in the same plan coordinate map;
   obtaining a second position of the electronic device and a second position of the vehicle in the same plan coordinate map;
   determining a movement direction of the electronic device according to the first position and the second position of the electronic device and a movement direction of the vehicle according to the first position and the second position of the vehicle; and
   determining that the vehicle is approaching the electronic device when the movement direction of the electronic device and the movement direction of the vehicle both have a movement component indicative of that the electronic device and the vehicle approach to each other.

5. The method of claim 1, wherein determining the current distance between the electronic device and the vehicle according to the positions of the electronic device and the positions of the vehicle comprises:
   obtaining a first position of the electronic device and a second position of the vehicle in the same plane coordinate map; and
   determining, according to the first position of the electronic device and the second position of the vehicle, a vertical distance between the electronic device and the vehicle, and determining the vertical distance as the current distance between the electronic device and the vehicle.

6. The method of claim 1, wherein determining the current distance between the electronic device and the vehicle according to the positions of the electronic device and the positions of the vehicle comprises:
   obtaining a first position of the electronic device and a second position of the vehicle in the same plane coordinate map; and
   determining, according to the first position of the electronic device and the second position of the vehicle, a linear distance between the electronic device and the vehicle, and determining the linear distance as the current distance between the electronic device and the vehicle.

7. The method of claim 1, wherein outputting the reminding information in response to that the current distance is smaller than the preset threshold comprises:
   outputting at least one of voice reminding information or vibration reminding information in response to that the current distance is smaller than the preset threshold, wherein the reminding information comprises the current distance; and
   providing an avoidance suggestion for a user of the electronic device, wherein the avoidance suggestion comprises lane changing, speed changing, or pausing.

8. The method of claim 1, further comprising:
   prior to determining the three NAN devices at the road junction,
      detecting whether traffic lights exist at the road junction; and
      determining that no traffic light exists within a preset range of the road junction.

9. An electronic device comprising:
   at least one processor; and
   a non-transitory computer readable storage, coupled to the at least one processor and storing at least one computer executable instruction thereon which, when executed by the at least one processor, causes the at least one processor to:
      determine three neighbor awareness network (NAN) devices at a road junction, and establish a Wi-Fi technology based NAN for communications among an electronic device and the three NAN devices;
      obtain positions of the electronic device and positions of a vehicle in a same plane coordinate map;
      wherein the at least one processor configured to obtain the positions of the electronic device and the positions of the vehicle in the same plane coordinate map is configured to:
      at preset time intervals:
         send a first positioning request for the electronic device to each of the three NAN devices, wherein the first positioning request is used for instructing each of the three NAN devices to obtain the fixed position of each of the three NAN devices and a distance between each of the three NAN devices and the electronic device; and
         send a second positioning request for the vehicle to each of the three NAN devices, wherein the second positioning request is used for instructing each of the three NAN devices to obtain a distance between each of the three NAN devices and the vehicle; and
         determine a position of the electronic device and a position of the vehicle in the same plane coordinate map in each preset time interval, according to the fixed position of each of the three NAN devices as received from each of the three NAN devices, the distance between each of the three NAN devices and the electronic device as received from each of the three NAN devices, and the distance between each of the three NAN devices and the vehicle as received from each of the three NAN devices;
      determine whether the vehicle is approaching the electronic device according to positional changes of the electronic device and the vehicle; and determine a current distance between the electronic device and the vehicle according to the positions of the electronic device and the positions of the vehicle based on a determination that the vehicle is approaching the electronic device, and output reminding information in response to that the current distance is smaller than a preset threshold.

10. The electronic device of claim 9, wherein the at least one processor configured to obtain the distance between each of the three NAN devices and the electronic device is configured to:
obtain a signal strength of signals received by the electronic device from each of the three NAN devices; and
determine, according to a preset corresponding relationship between a plurality of signal strengths and a plurality of distances and the signal strength of the signals received by the electronic device from each of the three NAN devices, the distance between each of the three NAN devices and the electronic device.

11. The electronic device of claim 9, wherein the at least one processor configured to determine whether the vehicle is approaching the electronic device according to the positional changes of the electronic device and the vehicle is configured to:
obtain a first position of the electronic device and a first position of the vehicle in the same plan coordinate map, and determine a first distance between the electronic device and the vehicle according to the first position of the electronic device and the first position of the vehicle;
obtain a second position of the electronic device and a second position of the vehicle in the same plan coordinate map, and determine a second distance between the electronic device and the vehicle according to the second position of the electronic device and the second position of the vehicle; and
determine that the vehicle is approaching the electronic device when the second relative distance is smaller than the first distance.

12. The electronic device of claim 9, wherein the at least one processor configured to determine whether the vehicle is approaching the electronic device according to the positional changes of the electronic device and the vehicle is configured to:
obtain a first position of the electronic device and a first position of the vehicle in the same plan coordinate map;
obtain a second position of the electronic device and a second position of the vehicle in the same plan coordinate map;
determine a movement direction of the electronic device according to the first position and the second position of the electronic device and a movement direction of the vehicle according to the first position and the second position of the vehicle; and
determine that the vehicle is approaching the electronic device when the movement direction of the electronic device and the movement direction of the vehicle both have a movement component indicative of that the electronic device and the vehicle approach to each other.

13. The electronic device of claim 9, wherein the at least one processor configured to determine the current distance between the electronic device and the vehicle according to the positions of the electronic device and the positions of the vehicle is configured to:
obtain a first position of the electronic device and a second position of the vehicle in the same plane coordinate map; and
determine, according to the first position of the electronic device and the second position of the vehicle, a vertical distance or a linear distance between the electronic device and the vehicle, and determine the vertical distance or the linear distance as the current distance between the electronic device and the vehicle.

14. The electronic device of claim 9, wherein the at least one processor configured to output the reminding information in response to that the current distance is smaller than the preset threshold is configured to:
output at least one of voice reminding information or vibration reminding information in response to that the current distance is smaller than the preset threshold, wherein the reminding information comprises the current distance; and
provide an avoidance suggestion for a user of the electronic device, wherein the avoidance suggestion comprises lane changing, speed changing, or pausing.

15. The electronic device of claim 9, wherein the at least one processor is further configured to:
prior to determining the three NAN devices at the road junction,
detect whether traffic lights exist at the road junction; and
determine that no traffic light exists within a preset range of the road junction.

16. A non-transitory computer readable storage medium storing computer programs, wherein the computer programs, when executed by a processor, causes the processor to:
determine three neighbor awareness network (NAN) devices at a road junction, and establish a Wi-Fi technology based NAN for communications among an electronic device and the three NAN devices;
obtain positions of the electronic device and positions of a vehicle in a same plane coordinate map;
wherein the computer programs, when executed by the processor, causing the processor to obtain the positions of the electronic device and the positions of the vehicle in the same plane coordinate map cause the processor to:
at preset time intervals:
send a first positioning request for the electronic device to each of the three NAN devices, wherein the first positioning request is used for instructing each of the three NAN devices to obtain the fixed position of each of the three NAN devices and a distance between each of the three NAN devices and the electronic device; and
send a second positioning request for the vehicle to each of the three NAN devices, wherein the second positioning request is used for instructing each of the three NAN devices to obtain a distance between each of the three NAN devices and the vehicle; and
determine a position of the electronic device and a position of the vehicle in the same plane coordinate map in each preset time interval, according to the fixed position of each of the three NAN devices as received from each of the three NAN devices, the distance between each of the three NAN devices and the electronic device as received from each of the three NAN devices, and the distance between each of the three NAN devices and the vehicle as received from each of the three NAN devices;

determine whether the vehicle is approaching the electronic device according to positional changes of the electronic device and the vehicle; and determine a current distance between the electronic device and the vehicle according to the positions of the electronic device and the positions of the vehicle based on a determination that the vehicle is approaching the electronic device, and output reminding information in response to that the current distance is smaller than a preset threshold.

17. The non-transitory computer readable storage medium of claim 16, wherein the computer programs, when executed by the processor, causing the processor to determine whether the vehicle is approaching the electronic device according to the positional changes of the electronic device and the vehicle cause the processor to:

obtain a first position of the electronic device and a first position of the vehicle in the same plan coordinate map, and determine a first distance between the electronic device and the vehicle according to the first position of the electronic device and the first position of the vehicle;

obtain a second position of the electronic device and a second position of the vehicle in the same plan coordinate map, and determine a second relative distance between the electronic device and the vehicle according to the second position of the electronic device and the second position of the vehicle; and determine that the vehicle is approaching the electronic device when the second relative distance is smaller than the first distance.

\* \* \* \* \*